US010248835B2

(12) United States Patent
Kim et al.

(10) Patent No.: US 10,248,835 B2
(45) Date of Patent: Apr. 2, 2019

(54) METHODS AND APPARATUSES FOR AUTHENTICATION USING BIOMETRIC INFORMATION

(71) Applicant: Samsung Electronics Co., Ltd., Suwon-si, Gyeonggi-do (KR)

(72) Inventors: Youngsung Kim, Suwon-si (KR); Kyuhong Kim, Seoul (KR); Hyungsuk Kim, Seongnam-si (KR); Sungjoo Suh, Seoul (KR); Chang Kyu Choi, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/293,452

(22) Filed: Oct. 14, 2016

(65) Prior Publication Data

US 2017/0193272 A1  Jul. 6, 2017

(30) Foreign Application Priority Data

Jan. 5, 2016  (KR) ........................ 10-2016-0000738

(51) Int. Cl.
*G06K 9/00* (2006.01)
*G06K 9/03* (2006.01)
*G06F 21/32* (2013.01)

(52) U.S. Cl.
CPC ..... *G06K 9/00087* (2013.01); *G06K 9/00013* (2013.01); *G06K 9/00067* (2013.01); *G06K 9/036* (2013.01); *G06F 21/32* (2013.01)

(58) Field of Classification Search
None
See application file for complete search history.

(56) References Cited

U.S. PATENT DOCUMENTS

| 6,778,692 B1* | 8/2004 | Yazici ................... G06T 5/002 382/132 |
| 7,489,807 B2 | 2/2009 | Hwang et al. |
| 7,885,437 B2 | 2/2011 | Hara |
| 7,936,907 B2 | 5/2011 | Maurer et al. |
| 8,452,060 B2 | 5/2013 | Maurer et al. |
| 2010/0254579 A1 | 10/2010 | Lee et al. |

(Continued)

FOREIGN PATENT DOCUMENTS

| JP | 4193163 B2 | 12/2008 |
| JP | 5049074 B2 | 10/2012 |
| KR | 100432491 B1 | 5/2004 |

(Continued)

OTHER PUBLICATIONS

"Towards Accurate Estimation of Fingerprint Ridge Orientation Using BPNN and Ternarization", Reddy et al., IOSR Journal of Computer Engineering (IOSR-JCE), e-ISSN: 2278-0661, p-ISSN: 2278-8727 vol. 13, Issue 1 (Jul.-Aug. 2013), pp. 99-101.*

(Continued)

*Primary Examiner* — Qian Yang
(74) *Attorney, Agent, or Firm* — Harness, Dickey & Pierce, P.L.C.

(57) ABSTRACT

Authentication methods and apparatuses are disclosed. An authentication method may include generating a quality profile of an authentication image, and determining an effective region in the authentication image based on the generated quality profile.

32 Claims, 20 Drawing Sheets

(56) References Cited

U.S. PATENT DOCUMENTS

2014/0020090 A1* 1/2014 Nada ............... G06K 9/036
726/19

FOREIGN PATENT DOCUMENTS

KR        101244220 B1     3/2013
KR        101460964 B1    11/2014

OTHER PUBLICATIONS

Prasad, R. et al., "Towards Accurate Estimation of Fingerprint Ridge Orientation Using BPNN and Ternarization," IOSR Journal of Computer Engineering, pp. 1-12, Jul. 31, 2013.
Extended European Search Report dated May 19, 2017.

* cited by examiner

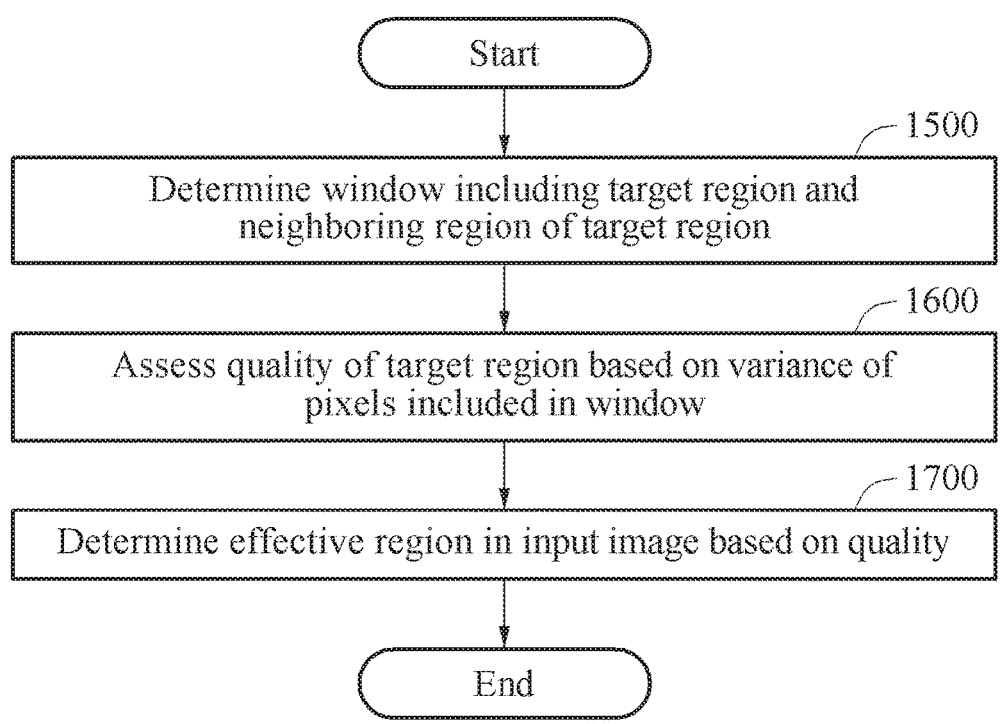

METHODS AND APPARATUSES FOR AUTHENTICATION USING BIOMETRIC INFORMATION

CROSS-REFERENCE TO RELATED APPLICATION

This application claims under 35 U.S.C. § 119 to Korean Patent Application No. 10-2016-0000738, filed on Jan. 5, 2016, in the Korean Intellectual Property Office, the entire contents of which are incorporated herein by reference in its entirety.

BACKGROUND

1. Field

At least one example embodiment relates to an authentication method and/or an apparatus using biometric information.

2. Description of the Related Art

Biometrics-based authentication technology relates to user authentication using a fingerprint, an iris, a voice, a face, blood vessels, and the like that are individually unique to a user. Such biological characteristics used for the authentication differ from individual to individual, rarely change during a lifetime, and have a low risk of being stolen or copied. In addition, individuals do not need to intentionally carry authentication materials, and thus may not experience an inconvenience using the biological characteristics when compared to other types of authentication. In such an authentication technology, a fingerprint recognition method is very commonly used for various reasons, for example, a high level of convenience, security, and economic efficiency. The fingerprint recognition method may reinforce security of a user device and readily provide various application services such as mobile payment.

SUMMARY

Some example embodiments relate to an authentication method.

In some example embodiment, the authentication method may include generating a quality profile of an authentication image, the quality profile indicating a quality of an authentication image that is an image on which authentication is to be performed, determining an effective region in the authentication image based on the quality profile, and determining whether the authentication image is authenticated based on the effective region to a registered image.

The generating of the quality profile of the authentication image may include determining a quality of a target region in the authentication image based on the target region and a neighboring region of the target region, the neighboring region being in the authentication image. The generating of the quality of the authentication image profile may include determining a window, the window including a target region in the authentication image and a neighboring region of the target region, and obtaining a quality of the target region based on a variance of pixels included in the determined window.

The authentication method may further include generating a quality profile of the registered image, and determining an effective region in the registered image based on the quality profile of the registered image. The determining of whether the authentication image is authenticated may include comparing the effective region in the authentication image to the effective region in the registered image.

The generating of the quality profile of the authentication image may include generating the quality profile based on a column, a row, or a single pixel of the authentication image.

The determining of the effective region in the authentication image may include dividing the authentication image into at least one effective segment and at least one ineffective segment by comparing the quality profile to a threshold. The at least one ineffective segment is a plurality of ineffective segments determining of the effective region in the authentication image may include determining a first region between two of the plurality of ineffective segments, the determined first region being the effective region in the authentication image. The determining of the effective region in the authentication image may include verifying a quality of the at least one ineffective segment, and determining a final ineffective segment based on a result of the verifying.

The verifying of the quality of the ineffective segment may include determining at least one of a first element associated with a width of the at least one ineffective segment, a second element associated with an error of the at least one ineffective segment, or a third element associated with a distance between the at least one ineffective segment and a boundary of the authentication image, and changing the ineffective segment to the effective segment based on the at least one of the first element, the second element, or the third element. The determining of the effective of the authentication image region may include determining a first region in the authentication image having a greatest width not including the final ineffective segment, the determined first region being the effective region in the authentication image.

The determining of the effective region in the authentication image may include determining the effective region to include the effective segment. The threshold may include an upper threshold part and a lower threshold part, the upper threshold part indicating an upper limit of a quality value for the effective segment, and the lower threshold part indicating a lower limit of the quality value for the effective segment. The determining of the effective region in the authentication image may include determining a quality ranking of a first region and a quality ranking of a second region based on the quality profile, the first region being at one end of the authentication image and the second region being at an opposite end of the one end of the authentication image, determining a removal region to be removed based on a ratio between the quality ranking of the first region and the quality ranking of the second region, and determining a remaining region in the authentication image as the effective region in the authentication image, the remaining region excluding the removal region. The removal region may have a preset and/or selected size.

The generating of the quality profile may include determining a first window including a target region and a neighboring region of the target region, determining a second window having a size different from a size of the first window, and obtaining a quality of the target region based on a quality profile associated with the first window and a quality profile associated with the second window.

The authentication method may further include determining whether an authentication error occurs due to the effective region in the authentication image, and adjusting a size of a window associated with the quality profile in response to the occurrence of an authentication error.

Other example embodiments relate to an authentication apparatus.

In some example embodiments, the authentication apparatus may include at least one processor configured to execute computer-readable instructions to generate a quality profile of an authentication image, the quality profile indicating a quality of an authentication image, determine an effective region in the authentication image based on the quality profile, and determine whether the authentication image is authenticated based on the effective region in the authentication image to a registered image.

The at least one processor may be configured to execute computer-readable instructions to determine a quality of a target region in the authentication image based on the target region and a neighboring region of the target region, the neighboring region being in the authentication image. The at least one processor may be configured to execute computer-readable instructions to determine a window, the window including a target region in the authentication image and a neighboring region of the target region, and obtaining a quality of the target region based on a variance of pixels included in the determined window. The at least one processor may be configured to execute computer-readable instructions to generate a quality profile of the registered image, and the region determiner may determine an effective region in the registered image based on the quality profile of the registered image. The at least one processor may be configured to execute computer-readable instructions to determine whether the authentication image is authenticated by comparing the effective region in the authentication image to the effective region in the registered image. The at least one processor may be configured to execute computer-readable instructions to generate the quality profile of the authentication image based on a column, a row, or a single pixel of the authentication image.

The at least one processor may be configured to execute computer-readable instructions to divide the authentication image into at least one effective segment and at least one ineffective segment by comparing the quality profile to a threshold. The at least one processor may be configured to execute computer-readable instructions to determine a first region between two of the plurality of ineffective segments, the determined first region being the effective region in the authentication image. The at least one processor may be configured to execute computer-readable instructions to determine at least one of a first element associated with a width of the at least one ineffective segment, a second element associated with an error of the at least one ineffective segment, or a third element associated with a distance between the at least one ineffective segment and a boundary of the authentication image, and change the ineffective segment to the effective segment based on the at least one of the first element, the second element, or the third element. The at least one processor may be configured to execute computer-readable instructions to determine the effective region in the authentication image to include the effective segment.

The at least one processor may be configured to execute computer-readable instructions to determine a quality ranking of a first region and a quality ranking of a second region based on the quality profile opposite end of the authentication image, the first region being at one end of the authentication image and the second region being at an opposite end of the one end of the authentication image, determine a removal region based on a ratio between the quality ranking of the first region and the quality ranking of the second region, and determine a remaining region in the authentication image as the effective region in the authentication image, the remaining region excluding the removal region.

The at least one processor may be configured to execute computer-readable instructions to determine a first window including a target region and a neighboring region of the target region and a second window having a size different from a size of the first window, and obtain a quality of the target region based on a variance of pixels included in the first window and a variance of pixels included in the second window.

Other example embodiments relate to an authentication method.

In some example embodiments, the authentication method may include determining a window, the window including a target region in an authentication image and a neighboring region of the target region, the neighboring region being in the authentication image, obtaining a quality of the target region based on a variance of pixels included in the window, and determining an effective region in the authentication image based on the quality.

Other example embodiments relate to an authentication apparatus.

In some example embodiments, the authentication apparatus may include at least one processor configured to execute computer-readable instructions to determine a window, the window including a target region in an authentication image and a neighboring region of the target region, the neighboring region being in the authentication image, obtain a quality of the target region based on a variance of pixels included in the window, and determine an effective region in the authentication image based on the quality.

Other example embodiments relate to a registration method.

In some example embodiments, the registration method may include receiving a registered image, generating a quality profile of the registered image, determining an effective region in the registered image based on the quality profile of the registered image, and generating a registration database based on the effective region in the registered image.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 20 is a flowchart illustrating an authentication method according to at least another example embodiment.

DETAILED DESCRIPTION

Figure 1:
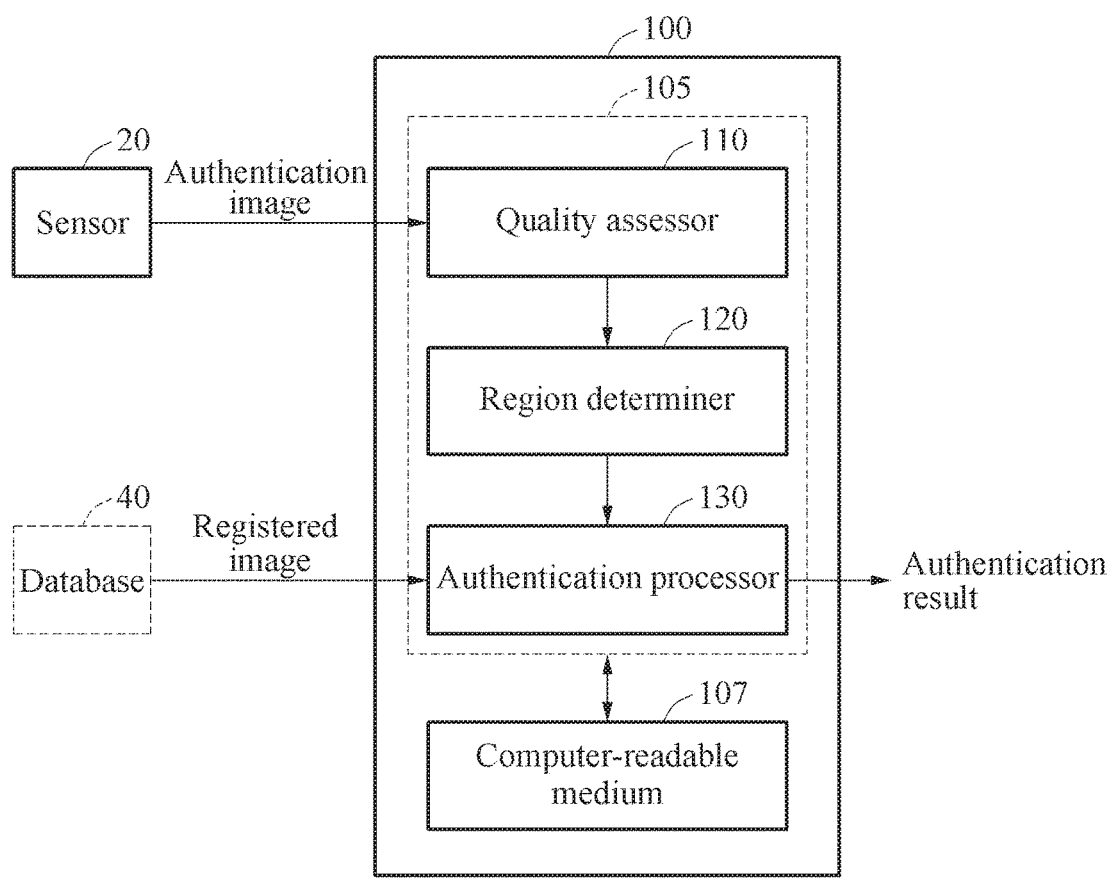
FIG. 1 is a diagram illustrating an authentication apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Example embodiments to be described herein may be applicable to a secure interface. For example, example embodiments may be applied to an authentication process for electronic payment through the secure interface among other authentication processes. According to the example embodiments, secure authentication may be more accurately performed even when noise is scanned along with a fingerprint through a sensor.

FIG. 1 is a diagram illustrating an authentication apparatus 100 according to at least one example embodiment. Referring to FIG. 1, the authentication apparatus 100 includes at least one processing device 105 and a computer-readable medium 107. The processing device 105 includes a quality assessor 110, a region determiner 120, and an authentication processor 130. In an example embodiment, the at least one processing device 105 is configured to perform the functions of the authentication apparatus 100 (e.g., the functions of the quality assessor 110, the region determiner 120 and the authentication processor 130) by executing computer-readable instructions stored in the computer-readable medium 107. In other example embodiments, at least one of the quality assessor 110, the region determiner 120 and the authentication processor 130 is hardware, such as an application-specific integrated circuit (ASIC). The authentication apparatus 100 may perform authentication using biometric information or bioinformation. The bioinformation may include, for example, a fingerprint, an iris, a voice, a face, and a blood vessel. Such bioinformation of a user may be pre-registered in a database. As used herein, registered information may indicate bioinformation of a user pre-registered in the database. The registered information may include, for example, a registered image and a registered voice. The user may input authentication information for the authentication. The authentication information may include, for example, an authentication image that is an image on which the authentication is to be performed and an authentication voice that is a voice on which the authentication is to be performed. The authentication apparatus 100 may compare the authentication information to the registered information, and generate an authentication result based on a result of the comparing. Although an authentication method using a fingerprint will be described hereinafter, the authentication method may be applicable to authentication to be performed using other types of bioinformation, for example, an iris, a voice, a face, and a blood vessel.

The authentication apparatus 100 may obtain a registered image from a prearranged database 40. The database 40 may be stored in a memory included in the authentication apparatus 100, or in an external device, for example, a server, that is connectable to the authentication apparatus 100 directly through a wire, through a network, or through wirelessly. The authentication apparatus 100 may match the authentication image to the registered image to compare the authentication image to the registered image. For example, the authentication apparatus 100 may scale, rotate, and/or translate the authentication image to overlap shared regions included in the authentication image and the registered image.

The authentication image may partially include noise due to various reasons. For example, a deformation may occur in a fingerprint image due to a pressure applied by pressing a sensor. When the authentication image is generated, a pressure applied to a sensing region may vary for each portion in the sensing region of a fingerprint sensor. Thus, at least a portion of the authentication image may be deformed. Similarly, the registered image may partially include noise due to various reasons. In such a case, comparing the authentication image including the noise to the registered image including the noise may reduce reliability in fingerprint recognition. For example, a false acceptance may occur from an attempt at authentication made by an unidentified or unregistered user, or a false rejection may occur from an attempt at authentication made by an identified or registered user. Thus, to increase accuracy of the authentication result, more accurate information may need to be extracted from the authentication information.

Although described hereinafter in detail, the description provided above may be applicable to the registered image in addition to the authentication image. For example, a quality of the registration database may be improved by extracting more accurate information from the registered image and registering the extracted information in the registration database.

Referring to FIG. 1, the quality assessor 110 may receive the authentication image. The authentication image may be received through a sensor 20. The sensor 20 may include, for example, a fingerprint sensor. A process of obtaining an authentication image will be described in detail with reference to FIGS. 2A and 2B.

Figure 2A:
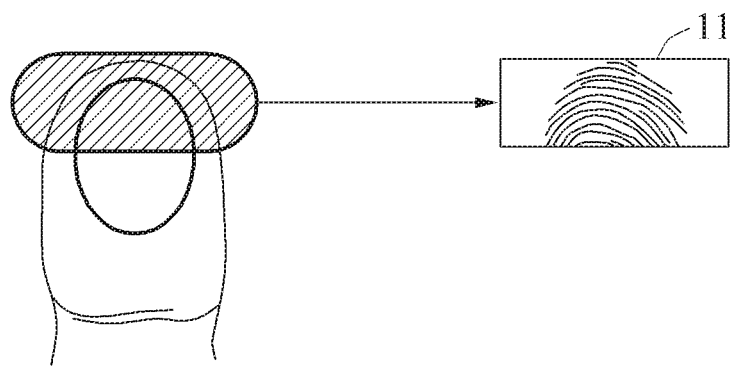
FIGS. 2A and 2B are diagrams illustrating a process of obtaining an authentication image according to at least one example embodiment.
Figure 2B:
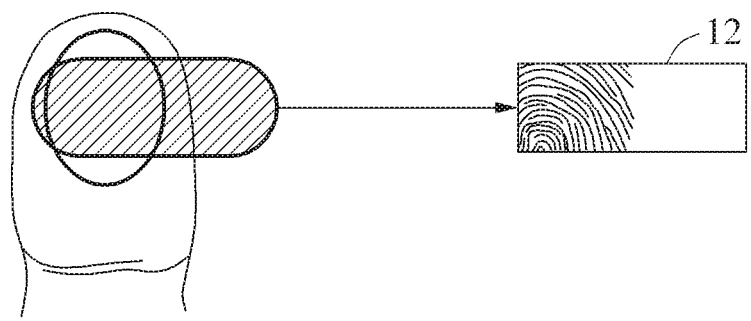

FIGS. 2A and 2B are diagrams illustrating a process of obtaining an authentication image according to at least one example embodiment. FIG. 2A illustrates a process of obtaining a fingerprint from a lower portion of a fingerprint sensor, and an authentication image 11 obtained from the lower portion of the fingerprint sensor. FIG. 2B illustrates a process of obtaining a fingerprint from a left side of a fingerprint sensor, and an authentication image 12 obtained from the left side of the fingerprint sensor. A size of a sensing region of the fingerprint sensor may be smaller than a size of a fingerprint of a user. Thus, the fingerprint sensor may obtain an authentication image of a portion of the fingerprint, for example, the authentication image 11 of FIG. 2A and the authentication image 12 of FIG. 2B. An authentication apparatus may generate an authentication result by comparing, to a registered image, the authentication image 11 and the authentication image 12 of respective portions of the fingerprint. As described above, noise may be included in the authentication image 11 and the authentication image 12. For example, noise may be included in an upper portion and both side portions of the authentication image 11, and noise may be include in a right side portion of the authentication image 12. The noise may reduce accuracy of the authentication result. Although described hereinafter in detail, an accuracy of an authentication result may be improved by removing noise in an authentication process and extracting an effective region from an authentication image for comparison between the authentication image and a registered image.

Such operations described in the foregoing may be applicable to the registered image. For example, in a registration process, noise may be removed from the registered image, an effective region may be extracted from the registered image, and the effective region in the registered image may be registered in a registration database. Alternatively, in the comparison operation between the authentication image and the registered image, effective regions may be extracted from the registered image and the authentication image, respectively, and authentication may be performed by comparing the extracted effective regions.

Although an example of extracting an effective region from an authentication image is described herein for simplicity of description, various changes and modifications may be made to the example to extract an effective region from a registered image.

Referring back to FIG. 1, the quality assessor 110 may generate a quality profile of the authentication image. The quality profile refers to data indicating a quality for each unit region in the authentication image. A central point of the unit region may be a column, a row, or a pixel, and the quality in the quality profile may be determined based on the column, the row, or the pixel. For example, a region in the authentication image that includes noise may have a low quality, and a region in the authentication image that includes fingerprint information may have a high quality. Thus, the quality profile may be used to extract an effective region. A process of assessing a quality of the authentication image to generate a quality profile will be described in detail with reference to FIG. 3.

Figure 3:
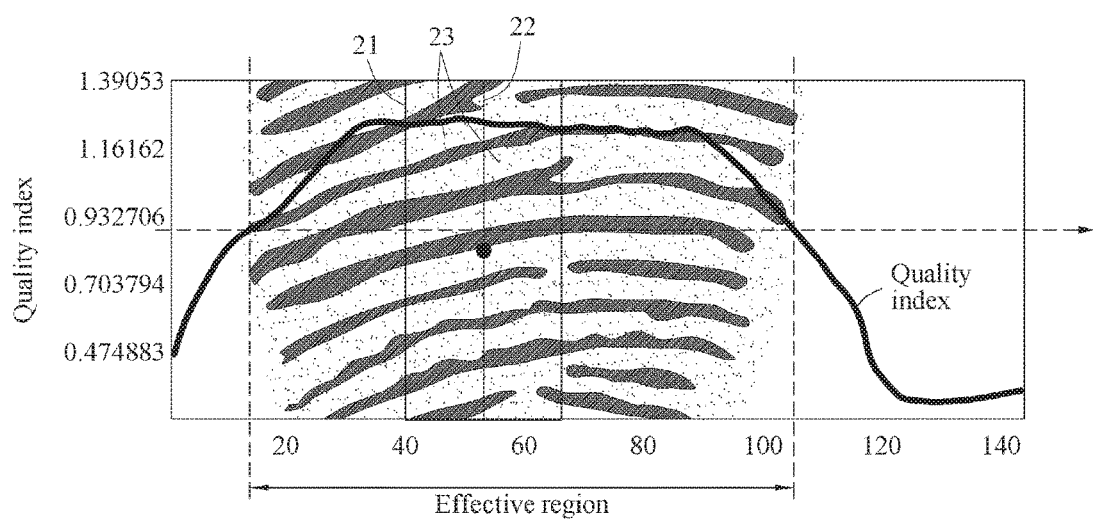
FIG. 3 is a diagram illustrating a process of assessing a quality of the authentication image according to at least one example embodiment.

FIG. 3 is a diagram illustrating a process of assessing a quality of the authentication image according to at least one example embodiment. In the process to be described with reference to FIG. 3, a quality profile may be generated based on a column of an authentication image. Referring to FIG. 3, a window 21 may be used to assess a quality based on a column of the authentication image corresponding to a target region 22. The window 21 may include the target region 22 and a neighboring region 23 of the target region 22. A quality of the target region 22 may be determined based on the target region 22 and the neighboring region 23 included in the window 21. Here, a gap between pixels included in the window 21 may be used to determine the quality of the target region 22. For example, the quality of the target region 22 may be determined based on a variance of the pixels included in the window 21. An overall quality of the authentication image may be assessed by moving the window 21 in the authentication image. For example, the overall quality of the authentication image may be assessed by moving the window 21 from one end of the authentication image to an opposite end of the authentication image. The quality profile may be represented by Equation 1 below.

$$Q(w), \forall w \in [1, \text{width}] \quad \text{[Equation 1]}$$

In Equation 1, "Q" denotes a quality profile. "w" denotes a coordinate value in an x-axis direction when an authentication image is indicated on an x-y plane. A minimum value and a maximum value of w are assumed to be 1 and "width," (width of window) respectively.

A quality of each column in the authentication image may be indicated as a quality index. The quality profile may include an overall quality index of the authentication image. In a graph illustrated in FIG. 3, an x axis indicates a coordinate of a column, and a y axis indicates a quality index of a corresponding column. Referring to the graph of FIG. 3, a quality index of a region in the authentication image that includes a fingerprint is relatively higher than a quality index of a region in the authentication image that does not include the fingerprint. Thus, the quality index may be used to determine an effective region.

Although the process of assessing a quality based on a column of an authentication image is described above, the quality may be assessed based on a row or a pixel of the authentication image using a similar process. For example, to assess the quality based on a row of the authentication image, a quality index of a target row may be determined using a window including the target row and a neighboring row of the target row. For another example, to assess the quality based on a pixel of the authentication image, a quality index of a target pixel may be determined using a window including the target pixel and a neighboring pixel of the target pixel.

In addition, the quality index may vary depending on a size of the window 21. That is, the quality index may be affected by the size of the window 21. A relationship between a size of a window and a quality index will be described in detail with reference to FIGS. 4 and 5.

Figure 4:
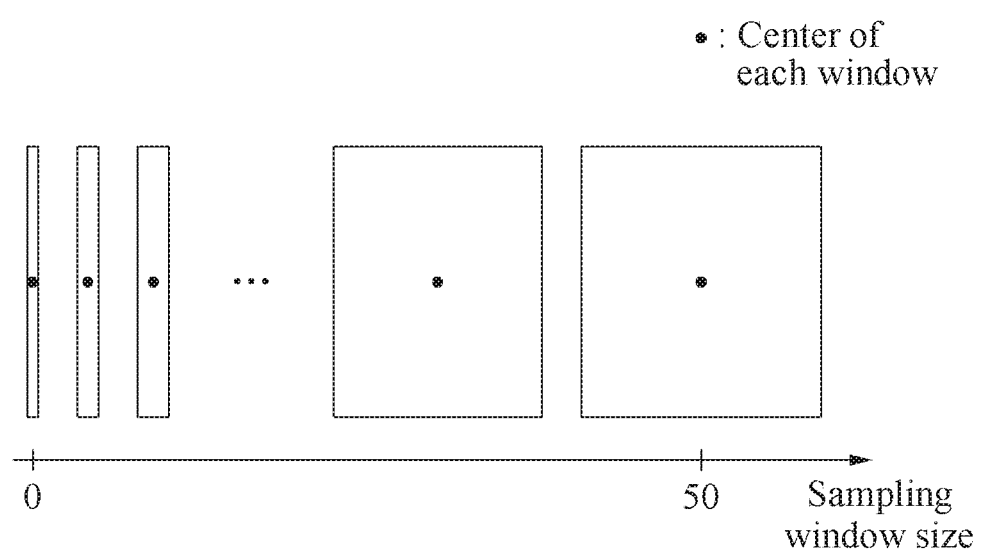
FIGS. 4 and 5 are diagrams illustrating a relationship between a size of a window and a quality index according to at least one example embodiment.
Figure 5:
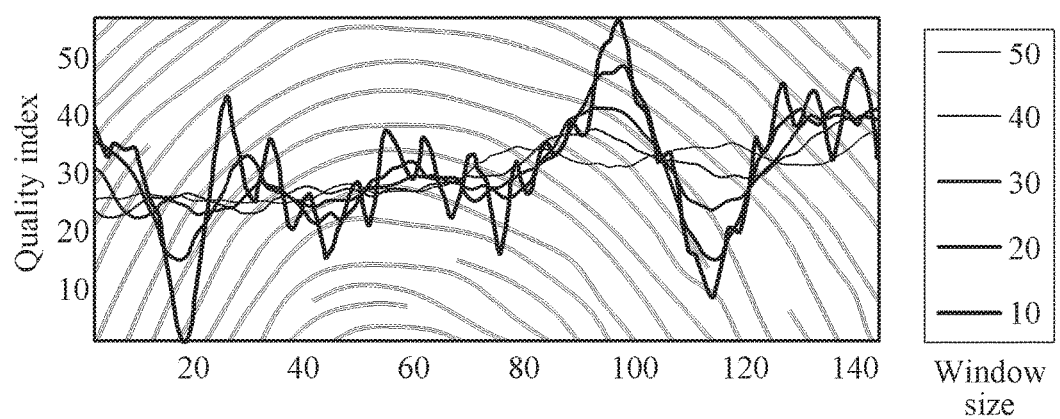

FIGS. 4 and 5 are diagrams illustrating a relationship between a size of a window and a quality index according to at least one example embodiment. FIG. 4 illustrates a plurality of windows having different sizes. For example, a window may have a relative size of 1 through 50. FIG. 5 illustrates a quality index for each size of a window of an authentication image. When a size of a window increases, a range of a change in the quality index over the overall quality index may become smaller. Conversely, when a size of the window decreases, the range of the change in the quality index over the overall quality index may become greater. Thus, a window of a selected size may be used to improve accuracy of an authentication result. For example, a single window of a fixed size may be used in an authentication process. For another example, windows of various sizes may be used in the authentication process. A process of generating a quality profile using multiple windows will be described in detail later.

Referring back to FIG. 1, the quality assessor 110 may generate a quality profile using a window. The quality assessor 110 may determine a quality of a target region in an authentication image based on the target region and a neighboring region of the target region. The quality assessor 110 may determine the window including the target region and the neighboring region, and assess the quality of the target region based on a variance of pixels included in the window. As described above, the quality assessor 110 may generate the quality profile based on a column, a row, or a pixel of the authentication image.

The region determiner 120 may determine an effective region in the authentication image based on the quality profile. The effective region refers to at least a portion of the authentication image to be compared to a registered image to generate an authentication result. The region determiner 120 may divide the authentication image into an effective segment and an ineffective segment by comparing the quality profile to a threshold. The threshold may include a lower threshold indicating a lower limit of a quality value for the effective segment. Also, the threshold may further include an upper threshold indicating an upper limit of the quality value for the effective segment. Based on a type of determining a quality index, the quality index may increase in a boundary between a region in the authentication image that includes a fingerprint and a region in the authentication image that does not include the fingerprint, and thus the effective region may be more effectively extracted from the authentication image by defining the upper limit of the threshold. A process of determining an effective segment and an ineffective segment will be described in detail with reference to FIG. 6.

Figure 6:
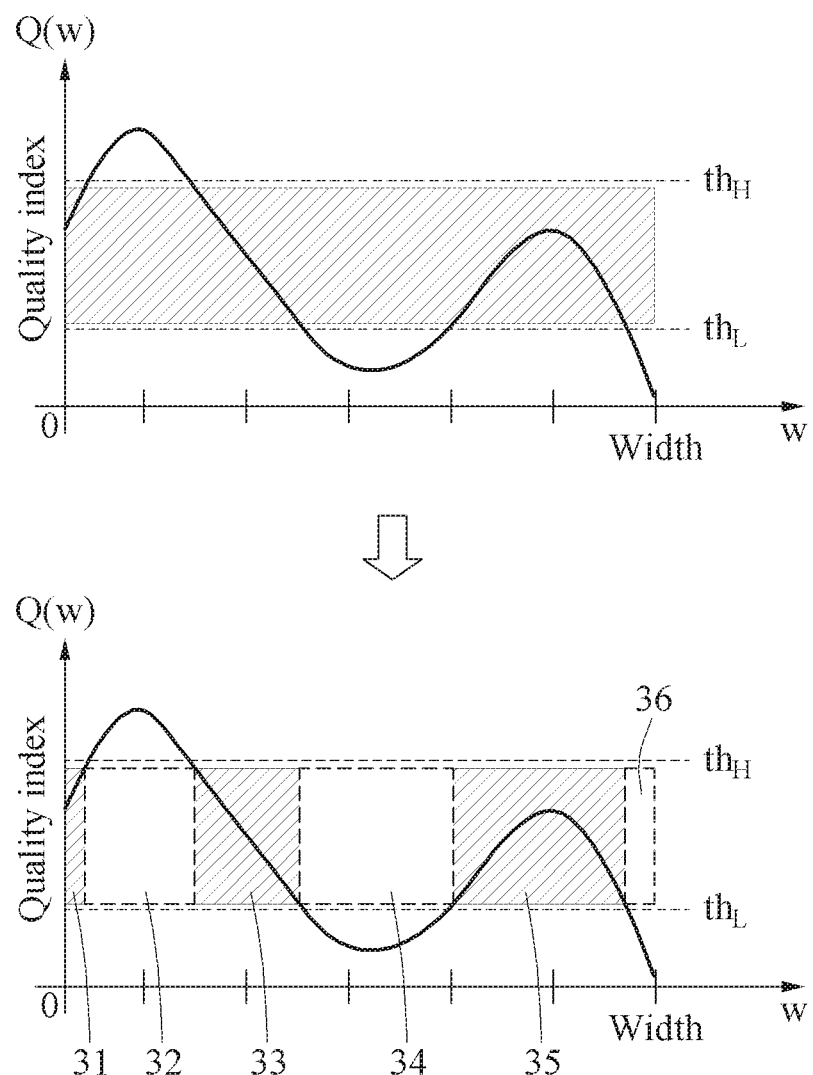
FIG. 6 is a diagram illustrating a process of determining an effective segment and an ineffective segment according to at least one example embodiment.

FIG. 6 is a diagram illustrating a process of determining an effective segment and an ineffective segment according to at least one example embodiment. FIG. 6 illustrates a process of dividing an authentication image into a plurality of segments, for example, a segment 31, a segment 32, a segment 33, a segment 34, a segment 35, and a segment 36. The segments 31 through 36 may be obtained through the division based on thresholds. A first threshold $th_H$ refers to an upper threshold, and a second threshold $th_L$ refers to a lower threshold. In the authentication image, a region between the first threshold $th_H$ and the second threshold $th_L$ may be determined to be an effective segment, for example, the segment 31, the segment 33, and the segment 35, and other regions below the first threshold $th_H$ or above the second threshold $th_L$ may be determined to be an ineffective segment, for example, the segment 32, the segment 34, and the segment 36. The effective segments 31, 33, and 35, and the ineffective segments 32, 34, and 36 may be defined by Equation 2 below.

$$R = \{w \mid 1(Q(w)) = 1\}, S = \{w \mid 1(Q(w)) = 0\} \quad \text{[Equation 2]}$$

where $$1(Q(w)) = \begin{cases} 1 & \text{if } th_L < Q(w) < th_H \\ 0 & \text{otherwise} \end{cases}, \forall w \in [1, \text{width}]$$

In Equation 2, "w" denotes a coordinate value on an x axis. "R" denotes an effective segment, for example, the segments 31, 33, and 35, and "S" denotes an ineffective segment, for example, the segments 32, 34, and 36. "$th_L$" and "$th_H$" denote a lower threshold and an upper threshold, respectively. Although described hereinafter, the effective region may be determined to include at least one of the effective segments 31, 33, or 35. The effective region may be determined based on segment arrangement. Alternatively, the effective region may be determined based on segment verification. A process of determining an effective region will be described further with reference to FIGS. 7 through 10.

Figure 7:
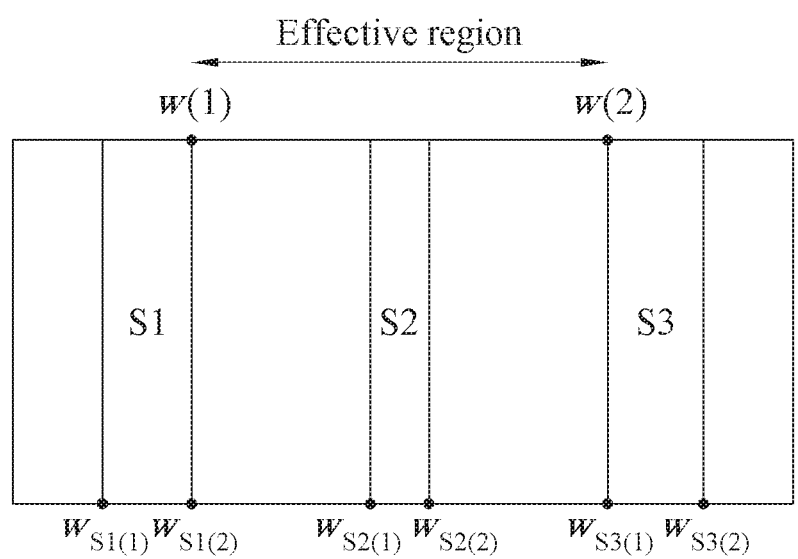
FIG. 7 is a diagram illustrating a process of determining an effective region based on segment arrangement according to at least one example embodiment.

FIG. 7 is a diagram illustrating a process of determining an effective region based on segment arrangement according to at least one example embodiment. Referring to FIG. 7, an authentication image includes an ineffective segment, for example, an ineffective segment S1, an ineffective segment S2, and an ineffective segment S3. In the authentication image, relative locations of the ineffective segments S1, S2, and S3 may be indicated as coordinate values. For example, the ineffective segment S1 may be defined as being located between $w_{S1(1)}$ and $w_{S1(2)}$. An effective region may be determined to be a region between the ineffective segment S1 at a rightmost end and the ineffective segment S3 at a leftmost end. That is, a region between w(1) and w(2) may be determined to be the effective region. Here, w(1) and w(2) may be determined by Equations 3 and 4 below.

$$w(1)=\min(w_{Si(2)})=w_{S1(2)} \quad \text{[Equation 3]}$$

$$w(2)=\max(w_{Si(1)})=w_{S3(1)} \quad \text{[Equation 4]}$$

In Equations 3 and 4, a subscript "i" denotes an index value of an ineffective segment. As illustrated in FIG. 7, the authentication image is assumed to have a coordinate value decreasing in a left direction and a coordinate value increasing in a right direction. Thus, "$w_{S3(1)}$" may be w(2) and "$W_{S1(2)}$" may be w(1).

Figure 8:
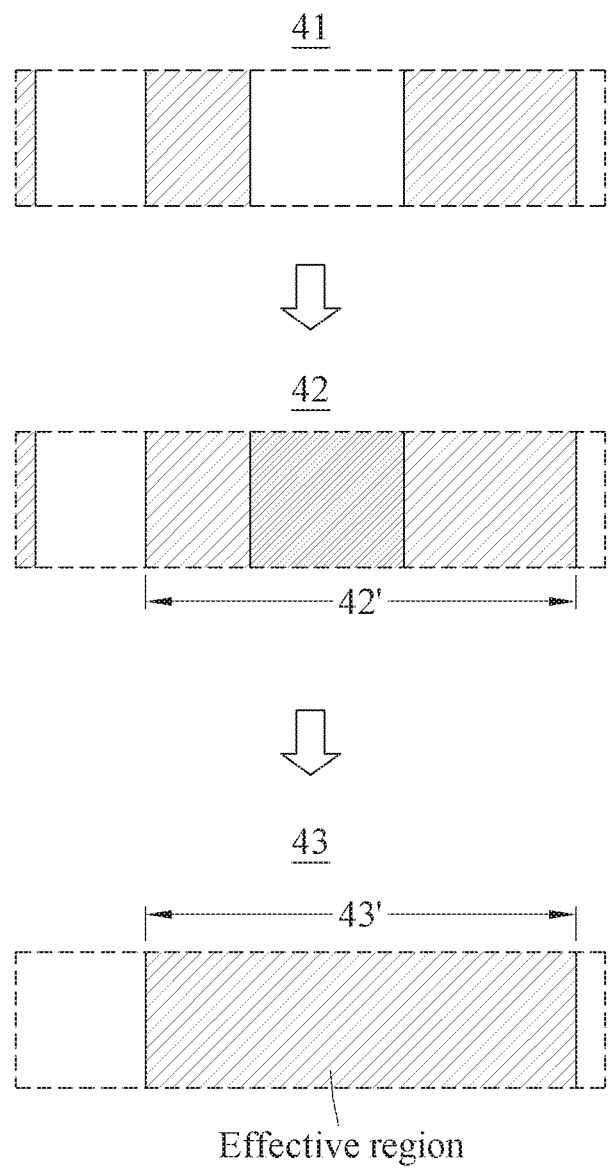
FIG. 8 is a diagram illustrating an effective region according to at least one example embodiment.

FIG. 8 is a diagram illustrating an effective region according to at least one example embodiment. Referring to FIG. 8, an authentication image 41 may include a plurality of segments classified into effective segments and ineffective segments. An authentication image 42 may include a candidate effective region 42' determined based on an arrangement of ineffective segments. An authentication image 43 may include an effective region 43' finally determined to be a region between an ineffective segment at a leftmost end and an ineffective segment at a rightmost end.

Figure 9:
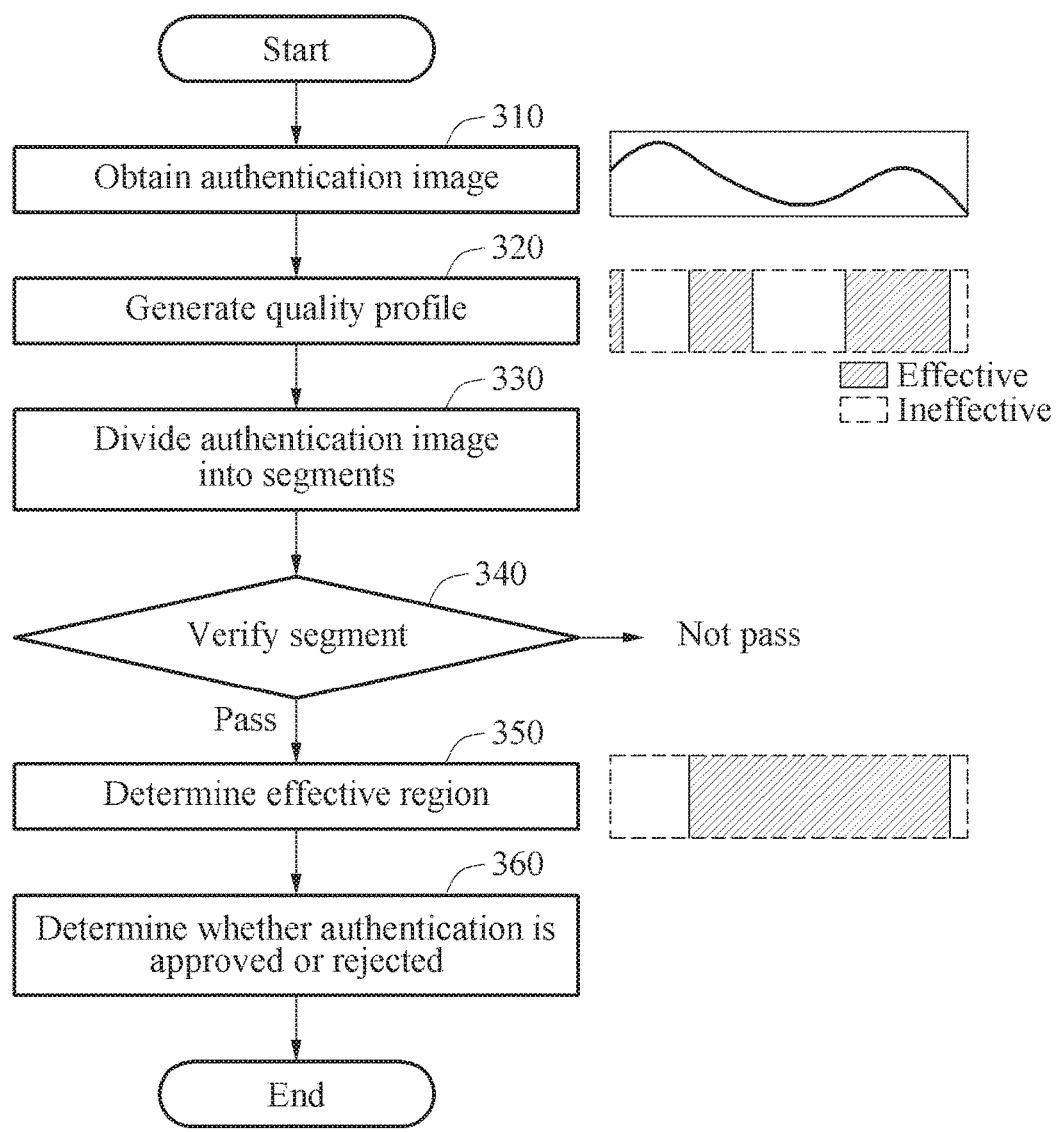
FIG. 9 is a diagram illustrating a process of determining an effective region based on a segment verification according to at least one example embodiment.

FIG. 9 is a diagram illustrating a process of determining an effective region based on segment verification according to at least one example embodiment. An authentication apparatus may determine whether a segment to be included in an effective region is present among ineffective segments by verifying each of the ineffective segments.

Referring to FIG. 9, in operation 310, the authentication apparatus obtains an authentication image. The authentication apparatus may obtain the authentication image through a fingerprint sensor. In operation 320, the authentication apparatus generates a quality profile. As described above, the quality profile may be generated based on a variance of pixels included in a window. In operation 330, the authentication apparatus divides the authentication image into segments. The segments may include an effective segment(s) and an ineffective segment(s).

In operation 340, the authentication apparatus verifies a segment. The segment verification may include determining whether to exclude the ineffective segment from an effective region, or determining whether to change the ineffective segment to an effective segment. For the segment verification, the authentication apparatus may consider at least one of a first element which is a width of the ineffective segment, a second element associated with an error of the ineffective segment, or a third element which is a distance between the ineffective segment and a boundary of the authentication image.

A process of calculating each element will be described hereinafter. Such elements may also be calculated through other processes in addition to the following process. The first element may be calculated by Equation 5 below.

$$\Delta_{Si}=|w_{Si}(1)-w_{Si}(2)| \quad \text{[Equation 5]}$$

In Equation 5, "$\Delta_{Si}$" denotes a width of an i-th segment, which is a first element. "$w_{S1(1)}$" and "$w_{S1(2)}$" denote a coordinate value at a leftmost end of the i-th segment and a coordinate value at a rightmost end of the i-th segment, respectively. Since, when a width of an ineffective segment is sufficiently great, the ineffective segment includes significant noise, the ineffective segment may be determinately excluded from an effective region.

The second element may be calculated by Equation 6 below.

$$E(s_i) = \sum_{w \in [w_{S_i}(1), w_{S_i}(2)]} \frac{e_w}{\Delta_{Si}} = \sum_{w \in [w_{S_i}(1), w_{S_i}(2)]} \frac{|Q(w_0) - Q(w)|}{w_{Si}(2) - w_{Si}(1)}, \quad \text{[Equation 6]}$$

where $w_0 = \operatorname{argmin}(Q(w) \mid w \in [w_{Si}(1), w_{Si}(2)])$ or $Q(w_0) = th_L$ or $th_H$ In Equation 6, "E" denotes a second element, which is a sum of errors based on a threshold relative to a unit width. "ew" denotes an error relative to "w." "Q" denotes a quality index. When an error of an ineffective segment is greater than the threshold, the ineffective segment may be excluded from an effective region. When the error of the ineffective segment is less than the threshold, the ineffective segment may be changed to an effective segment.

The third element may be calculated by Equation 7 below.

$$d_{Si}=\min(|w_{Si}(1)-1|,|w_{Si}(2)-\text{Width}|) \quad \text{[Equation 7]}$$

In Equation 7, "$d_{Si}$" denotes a distance between an ineffective segment and a boundary of an authentication image, which is a third element. In Equation 7, a left boundary value of the authentication image is assumed to be "1," and a right boundary value of the authentication image is assumed to be a "Width." Thus, "$d_{Si}$" may be defined as a smaller value of a difference between a minimum value of the ineffective segment and the left boundary value of the authentication image and a difference between a maximum value of the ineffective segment and the right boundary value of the authentication image.

To determine the effective region, all of the first element, the second element, and the third element may be considered. For example, when the first element is greater than a first threshold $th_w$, the second element is greater than a second threshold $th_e$, and the third element is less than a third threshold $th_d$, the ineffective segment may be determinately excluded from the effective region. Such a standard for determining an effective region may be represented by Equation 8 below.

$$S=\{Si|\Delta_{Si}>th_w \text{ and } E(Si)>th_e \text{ and } d_{Si}<th_d\} \quad \text{[Equation 8]}$$

In Equation 8, "S" denotes a final ineffective segment, and "$_{Si}$" denotes an i-th segment. The final ineffective segment may be excluded from an effective region. That is, when a segment is determined to be an ineffective segment in a segment division process, the segment may be excluded from the effective region after being determined to be a final ineffective segment in a segment verification process. The thresholds $th_w$, $th_e$ and $th_d$ may be determined based on empirical data.

In operation 350, the authentication apparatus determines the effective region. The effective region may be determined by Equation 9 below.

$$\operatorname*{argmax}_{r_i} \Delta_{r_i}, \text{ where} \quad \text{[Equation 9]}$$

$$r_i \in R = S^c \text{ and } \Delta_{r_i} = |w_{r_i}(1) - w_{r_i}(2)|$$

In Equation 9, "$S^c$" denotes a complementary set of final ineffective segments obtained using Equation 8. To improve accuracy in authentication, an effective region of a selected size may be used and adjusted. Thus, a set of segments having a greatest width among complementary sets of final ineffective segments may be determined to be the effective region. In operation 360, the authentication apparatus determines whether the authentication is approved or rejected. The authentication apparatus may determine whether the authentication is approved or rejected by comparing the effective region to the registered image.

Also, in operation 360, the authentication apparatus determines whether the authentication is approved or rejected by comparing the effective region in the authentication image to an effective region in the registered image. In such a case, a process of determining the effective region in the registered image may be performed similarly to the process of determining the effective region in the authentication image.

Referring back to FIG. 1, the authentication processor 130 may determine whether the authentication is approved or rejected. The authentication processor 130 may determine whether the authentication is approved or rejected by comparing the effective region in the authentication image to the registered image. The authentication processor 130 may obtain the registered image from the prearranged database. Alternatively, in a registration process, the effective region in the registered image may be extracted and the extracted region may be stored in the database. In such a case, the authentication processor 130 may receive the effective region of the registered image. Alternatively, the quality assessor 110 may receive the registered image in addition to the authentication image. In such a case, the quality assessor 110 may generate a quality profile of the registered image, and the region determiner 120 may determine the effective region in the registered image. The authentication processor 130 may perform the authentication and determine whether the authentication is approved or rejected by comparing the effective region in the authentication image to the effective region in the registered image.

The authentication processor 130 may match the authentication image to the registered image to perform the comparison between the authentication image and the registered image. For example, the authentication processor 130 may scale, rotate, and/or translate the authentication image to overlap shared regions in the authentication image and the registered image. The authentication processor 130 may output an authentication result. The authentication result may be used for user authentication in, for example, a smartphone, a mobile device, a home appliance, a remote controller, a vehicle, and an access control device. In addition, the authentication result may be used for electronic payment in, for example, a smartphone and a mobile device, or for user authentication or starting a vehicle based on fingerprint recognition in the vehicle. Further, the authentication result may be used for user authentication in a smart home appliance, for example, a smart television (TV).

Figure 10:
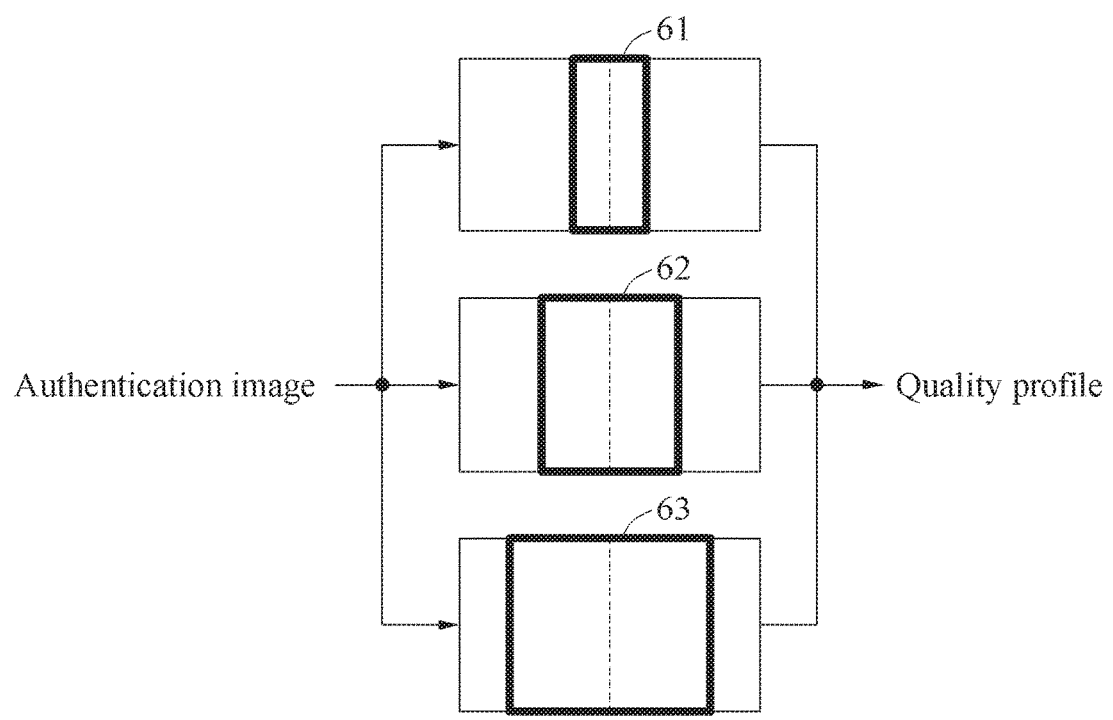
FIG. 10 is a diagram illustrating a process of generating a quality profile based on a size of a window according to at least one example embodiment.

FIG. 10 is a diagram illustrating a process of generating a quality profile based on a size of a window according to at least one example embodiment. As described above, windows of various sizes may be used in an authentication process. For example, as illustrated in FIG. 10, a first window 61, a second window 62, and a third window 63, which have different sizes from each other, may be used to generate a quality profile. A quality profile generated based on the first window 61 may have a greater range of a change than a quality profile generated based on the third window 63. An authentication apparatus may generate an integrated quality profile using the multiple windows, and determine an effective region using the integrated quality profile. Alternatively, the authentication apparatus may adjust a size of a window based on whether an authentication error occurs, and generate a quality profile using the window having the adjusted size. Detailed examples will be described with reference to FIGS. 11 and 12.

Figure 11:
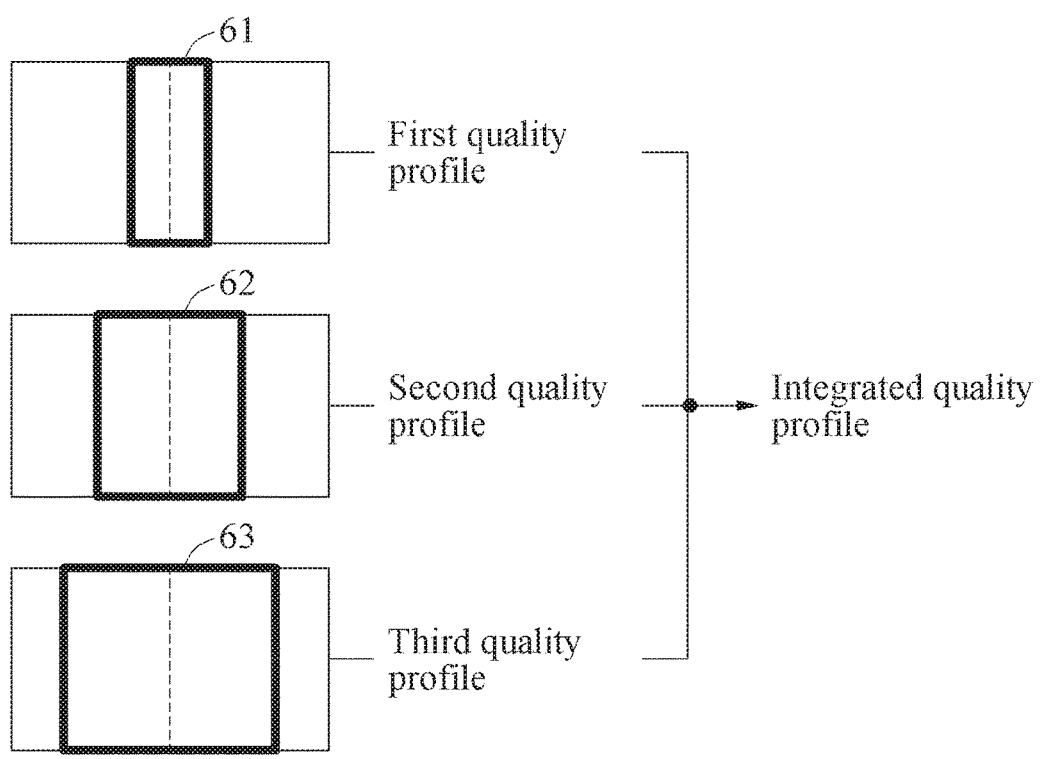
FIG. 11 is a diagram illustrating a process of generating an integrated quality profile using a multiple windows according to at least one example embodiment.

FIG. 11 is a diagram illustrating a process of generating an integrated quality profile using multiple windows according to at least one example embodiment. An authentication apparatus may generate an integrated quality profile using multiple windows, and determine an effective region based on the integrated quality profile. For example, as illustrated in FIG. 11, a first quality profile may be generated based on a first window 61, a second quality profile may be generated based on a second window 62, and a third quality profile may be generated based on a third window 63. The authentication apparatus may generate the integrated quality profile using a fusion calculation based on the first quality profile, the second quality profile, and the third quality profile. The authentication apparatus may determine the effective region based on the integrated quality profile. The fusion calculation may include various statistical calculations, for example, a calculation of an average, a calculation of a sum, and/or a calculation of a weighted average. For example, the authentication apparatus may generate the integrated quality profile based on an average or a mean value of the first quality profile, the second quality profile, and the third quality profile.

Figure 12:
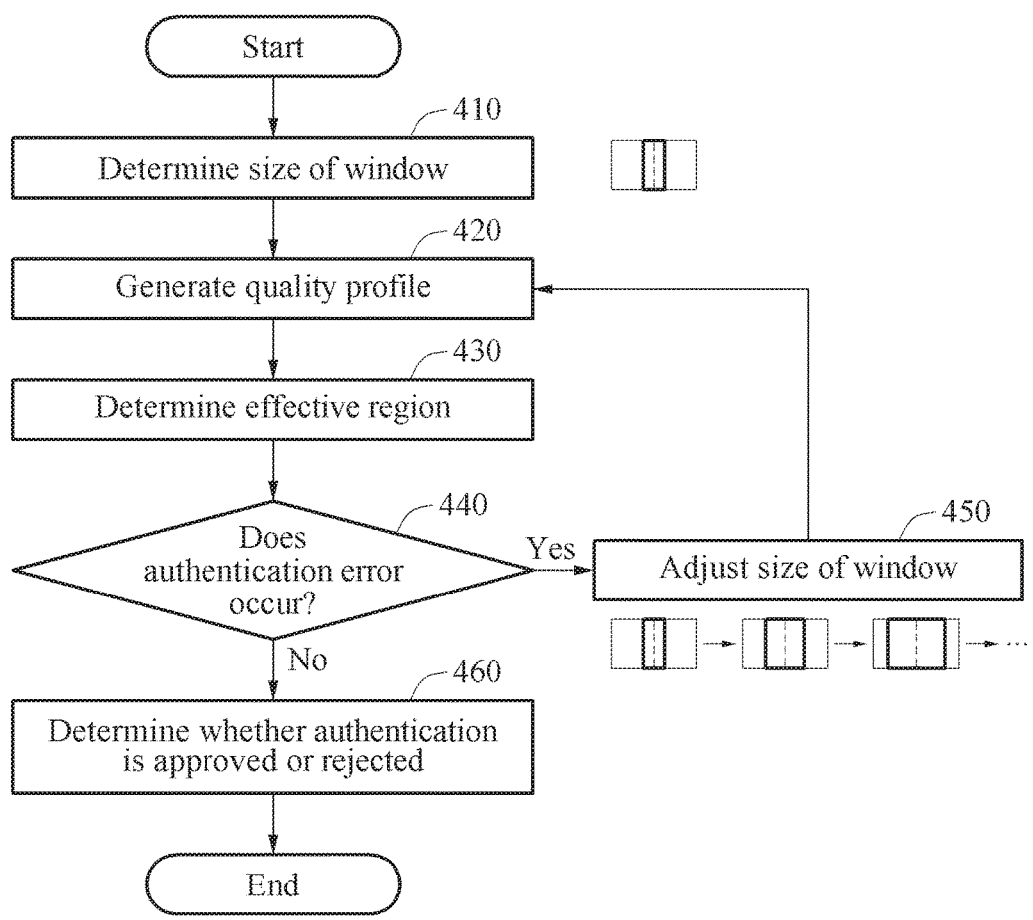
FIG. 12 is a diagram illustrating a process of adjusting a size of a window according to at least one example embodiment.

FIG. 12 is a diagram illustrating a process of adjusting a size of a window according to at least one example embodiment. Referring to FIG. 12, in operation 410, an authentication apparatus determines a size of a window. The size of the window may be determined to be a preset and/or selected default value. For example, the default value may be determined based on an average size of a fingerprint to be obtained through a fingerprint sensor. In operation 420, the authentication apparatus generates a quality profile. The authentication apparatus may generate the quality profile using the size of the window determined in operation 410. In operation 430, the authentication apparatus determines an effective region. The authentication apparatus may determine the effective region based on the generated quality profile.

In operation 440, the authentication apparatus determines whether an authentication error occurs. The authentication error may occur during (i.e., before authentication is approved or rejected based on the effective region). For example, the authentication error may occur when a size of the effective region is not sufficiently large to be compared to a registered image. The authentication apparatus may generate the authentication error when the authentication apparatus does not approve or reject user authentication based on the effective region. The size of the window may affect an amount of a change in a quality index in the quality profile, and thus the size of the effective region may vary depending on the size of the window. In such a case, the authentication apparatus may obtain the effective region of appropriate selected size by adjusting the size of the window.

In operation 450, the authentication apparatus adjusts the size of the window if the authentication apparatus determines an error occurred in operation 440. The authentication apparatus may decrease or increase the size of the window. The authentication apparatus may adjust the size of the window to increase the effective region. Operations 420 through 450 may be repetitively performed until the authentication error does not occur.

In operation 460, the authentication apparatus determines whether the authentication is approved or rejected. The authentication apparatus may approve or reject the user authentication by comparing the effective region to the registered image. The authentication apparatus may output an authentication result based on the determination of whether the authentication is approved or rejected.

Figure 13:
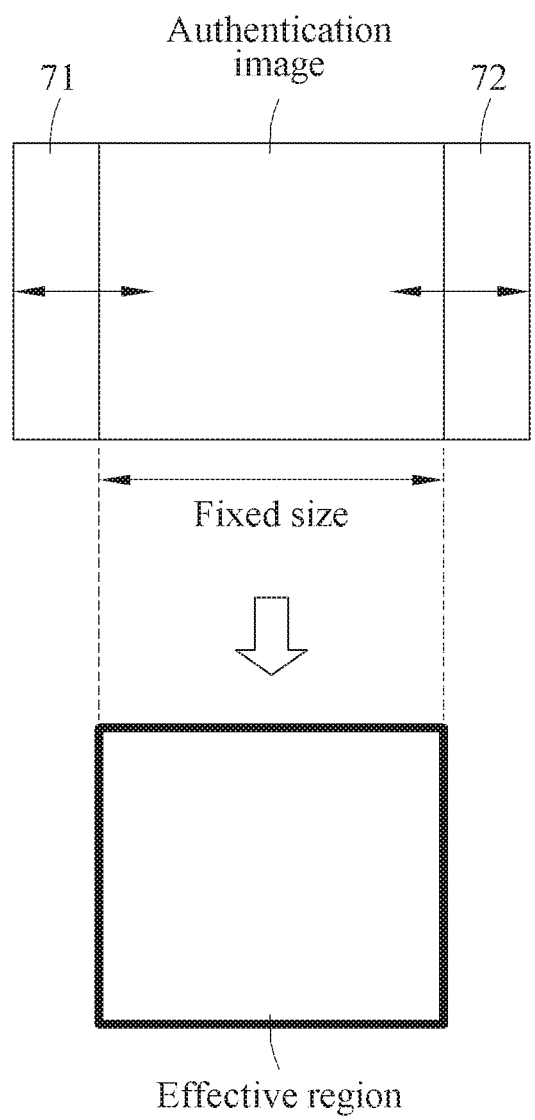
FIG. 13 is a diagram illustrating a process of determining a fixed-size effective region according to at least one example embodiment.

FIG. 13 is a diagram illustrating a process of determining a fixed size effective region according to at least one example embodiment. Referring to FIG. 13, an effective region of a fixed size may be determined using a removal region corresponding to an edge region. For example, when the effective region of the fixed size is determined by reducing a horizontal length of an authentication image, the removal region may include a first removal region 71 at a left edge of the authentication image and a second removal region 72 at a right edge of the authentication image.

Thus, an overall removal region including the first removal region 71 and the second removal region 72 may have a fixed size. Thus, the effective region obtained by removing the overall removal region from the authentication image may have the fixed size. Here, a size of the first removal region 71 may differ from a size of the second removal region 72. Each of the first removal region 71 and the second removal region 72 may have a maximum size. For example, when a quality of the first removal region 71 is greatly higher than a quality of the second removal region 72, an authentication apparatus may determine the second removal region 72 to be the overall removal region.

A ratio between the size of the first removal region 71 and the size of the second removal region 72 may be determined based on a quality profile of each of the first removal region 71 and the second removal region 72. A size of a removal region may be inversely proportional to a quality of the removal region. That is, the authentication apparatus may determine the size of the removal region to be inversely proportional to the quality of the removal region. For example, when the quality of the first removal region 71 is two times higher than the quality of the second removal region 72, the authentication apparatus may determine the size of the first removal region 71 to be ½ times greater than the size of the second removal region 72 to determine the overall removal region. According to at least one example embodiment, a size of a removal region may be determined based on a quality ranking. A process of determining a removal region based on a quality ranking will be described in detail with reference to FIG. 14.

Figure 14:
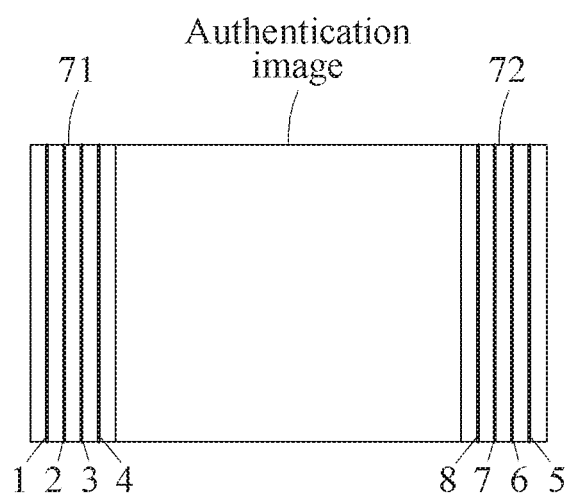
FIG. 14 is a diagram illustrating a process of determining a removal region based on a quality ranking according to at least one example embodiment.

FIG. 14 is a diagram illustrating a process of determining a removal region based on a quality ranking according to at least one example embodiment. Referring to FIG. 14, an authentication image may include a first removal region 71 and a second removal region 72. The first removal region 71 may include columns, for example, a column 1, a column 2, a column 3, and a column 4. The second removal region 72 may include columns, for example, a column 5, a column 6, a column 7, and a column 8. The number of the columns included in the first removal region 71 and the second removal region 72 is provided as an example only, and thus the number of columns included in a removal region may be greater or less than the number provided as the preceding example. In addition, when a quality profile is generated based on a row or a pixel, a removal region may be determined through a process similar to the process to be described hereinafter.

An authentication apparatus may determine a quality ranking of the columns, for example, the columns 1 through 8, based on a quality profile. When a quality index based on the quality profile increases, a higher quality rank may be assigned. For example, when the column 3 has a highest quality index, and a quality index is lower in order of the column 7, the column 5, the column 6, the column 8, the column 4, the column 2, and the column 1, a quality rank of the column 3 may be determined to be 1, a quality rank of the column 7 may be determined to be 2, and respective quality ranks of the remaining columns 5, 6, 8, 4, 2, and 1 may be determined in a sequential order.

The authentication apparatus may determine a removal region based on a quality ranking. When a column having a higher quality rank is included, the authentication apparatus may determine a size of the removal region to be smaller. That is, when the removal region includes a column having a higher quality rank, the size of the removal region may become smaller. The authentication apparatus may determine the removal region to be inversely proportional to the quality ranking. The columns 1, 2, 3, and 4 of the first removal region 71 may correspond to the quality ranks 8, 7, 1, and 6, respectively. The columns 5, 6, 7, and 8 of the second removal region 72 may correspond to the quality ranks 3, 4, 2, and 5, respectively. A preset score may be assigned to each of the columns 1 through 8 based on the quality ranking. For example, score 8 may be assigned to the quality rank 1, score 7 may be assigned to the quality rank 2, and score 1 may be assigned to the quality rank 8. In such an example, a total of scores, 14, may be assigned to the first removal region 71, and a total of scores, 22, may be assigned to the second removal region 72. Thus, a size of the first removal region 71 and a size of the second removal region 72 may be determined to be at a ratio of 14:22. A process of assigning a score described in the foregoing is provided as an illustrative example only, and thus a score may be assigned to each rank through various processes. In addition, a ratio between the size of the first removal region 71 and the size of the second removal region 72 may be determined based on a ratio between ranks or scores.

Figure 15:
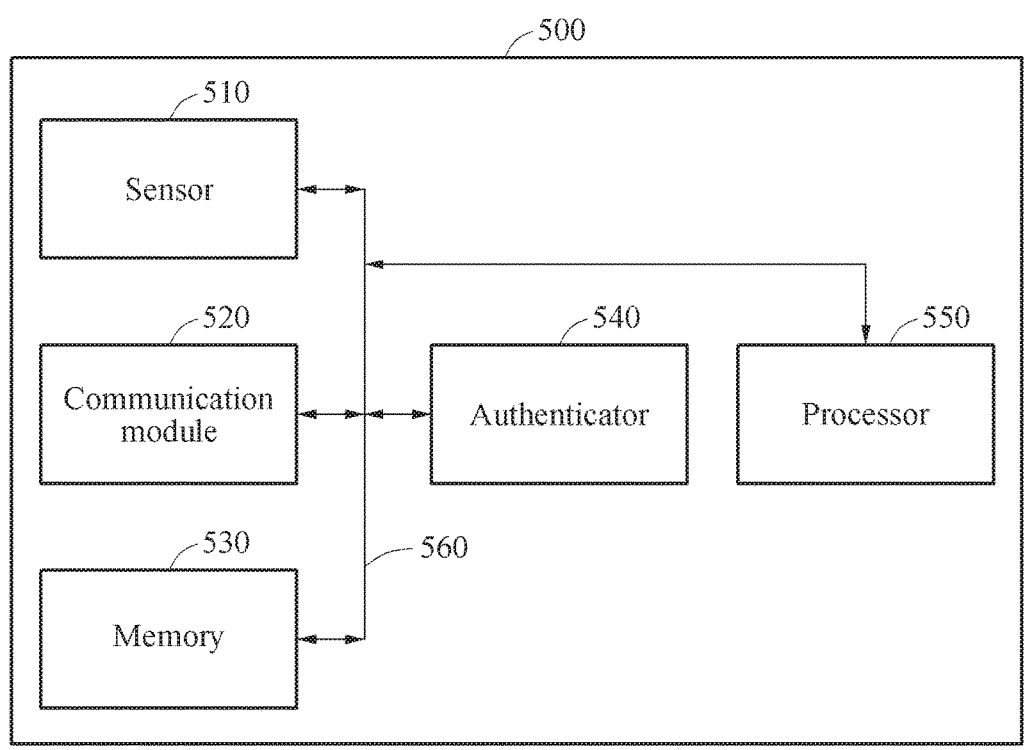
FIG. 15 is a diagram illustrating an electronic device according to at least one example embodiment.

FIG. 15 is a diagram illustrating an electronic device 500 according to at least one example embodiment. Referring to FIG. 15, the electronic device 500 includes a sensor 510, a communication module 520, a memory 530, an authenticator 540, a processor 550 and a bus 560. The sensor 510, the communication module 520, the memory 530, the authenticator 540 and the processor 550 may communicate using the bus 560. The electronic device 500 may include, for example, a smartphone, a smart television (TV), a desktop, a laptop, or a tablet personal computer (PC). The authenticator 540 may include hardware configured to execute software or hardware. For example, the authenticator 540 and the processor 550 may perform the functions described herein by executing computer-readable instructions stored in the memory 530.

As described above, the authenticator 540 may generate a quality profile of an authentication image, and determine an effective region in the authentication image based on the generated quality profile. The authenticator 540 may determine whether authentication is approved or rejected by comparing the effective region to a registered image. The authenticator 540 may receive the authentication image from the sensor 510. In addition, the authenticator 540 may receive the authentication image from the communication module 520 or the memory 530. The authentication image may include a fingerprint of a user. The authenticator 540 may output an authentication result based on whether the authentication is approved or rejected.

The sensor 510 may include a fingerprint sensor. The sensor 510 may provide a sensed image to the authenticator 540. The communication module 520 may communicate an external device through various communication technologies. The communication module 520 may provide data received from the external device as input data to the authenticator 540. For example, the communication module

520 may provide the registered image to the authenticator 540. The memory 530 may store the registered image. The memory 530 may provide the stored registered image to the authenticator 540.

The processor 550 may receive the authentication result from the authenticator 540. The processor 550 may perform a process according to the received authentication result. For example, the processor 550 may use the authentication result for user authentication or electronic payment. In addition, the processor 550 may use the authentication result for starting a vehicle.

Figure 16:
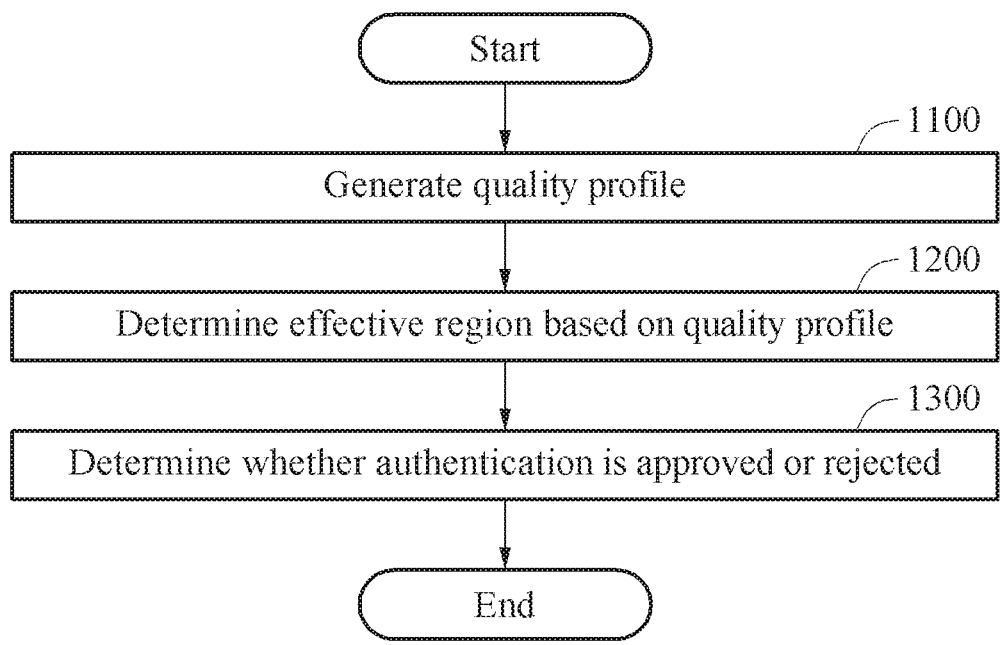
FIG. 16 is a flowchart illustrating an authentication method according to at least one example embodiment.

FIG. 16 is a flowchart illustrating an example of an authentication method according to at least one example embodiment. Referring to FIG. 16, in operation 1100, an authentication apparatus generates a quality profile of an input image. Here, the input image may be an authentication image or a registered image. In operation 1200, the authentication apparatus determines an effective region in the input image based on the generated quality profile. The authentication apparatus may determine an effective region in the authentication image or an effective region in the registered image. In operation 1300, the authentication apparatus determines whether authentication is approved or rejected by comparing the authentication image to the registered image. According to at least one example embodiment, the authentication apparatus may determine whether the authentication is approved or rejected by comparing the effective region in the authentication image to the effective region in the registered image.

Figure 17:
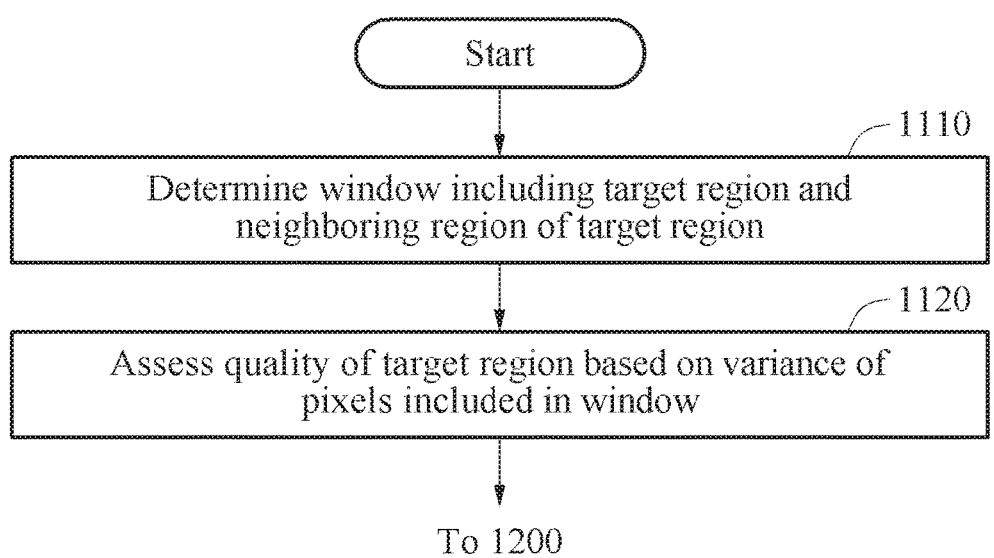
FIG. 17 is a flowchart illustrating a process of generating a quality profile according to at least one example embodiment.

FIG. 17 is a flowchart illustrating a process of generating a quality profile according to at least one example embodiment. Referring to FIG. 17, in operation 1110, an authentication apparatus determines a window including a target region and a neighboring region of the target region. In operation 1120, the authentication apparatus assesses a quality of the target region based on a variance of pixels included in the window.

Figure 18:
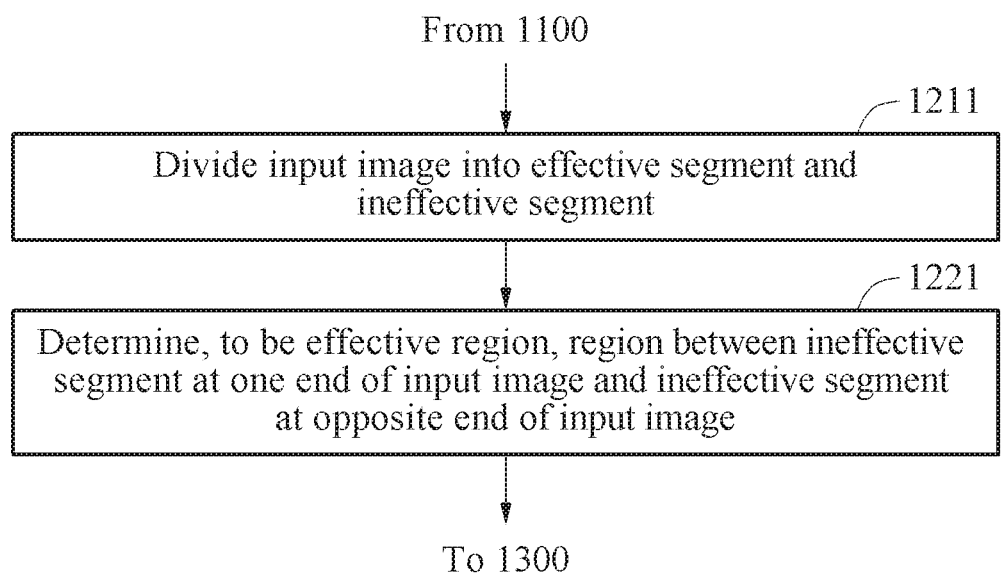
FIG. 18 is a flowchart illustrating a process of determining an effective region based on a segment arrangement according to at least one example embodiment.

FIG. 18 is a flowchart illustrating a process of determining an effective region based on segment arrangement according to at least one example embodiment. Referring to FIG. 18, in operation 1211, an authentication apparatus divides an input image into an effective segment and an ineffective segment. In operation 1221, the authentication apparatus determines, to be an effective region, a region between an ineffective segment at one end of the input image and an ineffective segment at an opposite end of the input image.

Figure 19:
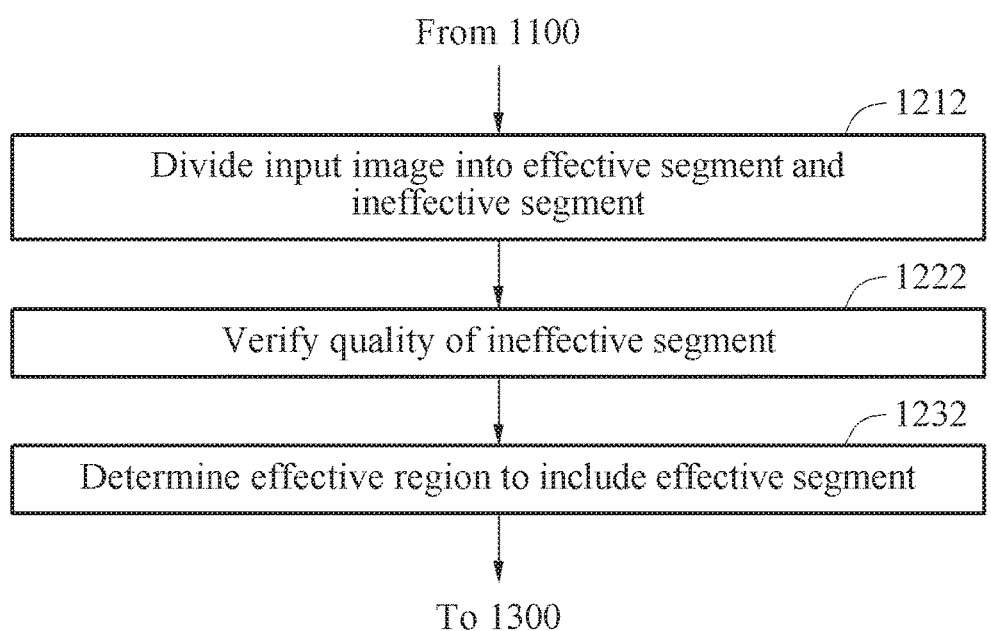
FIG. 19 is a flowchart illustrating a process of determining an effective region based on a segment verification according to at least one example embodiment.

FIG. 19 is a flowchart illustrating a process of determining an effective region based on segment verification according to at least one example embodiment. Referring to FIG. 19, in operation 1212, an authentication apparatus divides an input image into an effective segment and an ineffective segment. In operation 1222, the authentication apparatus verifies a quality of the ineffective segment. In operation 1232, the authentication apparatus determines an effective region to include the effective segment.

FIG. 20 is a flowchart illustrating another example of an authentication method according to at least one example embodiment. Referring to FIG. 20, in operation 1500, an authentication apparatus determines a window including a target region and a neighboring region of the target region. In operation 1600, the authentication apparatus assesses a quality of the target region based on a variance of pixels included in the window. In operation 1700, the authentication apparatus determines an effective region in an input image based on the quality.

The descriptions provided with reference to FIGS. 1 through 14 may be applicable to each of the operations described with reference to FIGS. 16 through 20, and thus a more detailed and repeated description will be omitted here.

The units and/or modules (e.g., the quality assessor 110, the region determiner 120, the authentication processor 130 and the authenticator 540) described herein may be implemented using hardware components and hardware executing software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication method, comprising:
   generating a quality profile of an authentication image, the quality profile of the authentication image indicating a quality of the authentication image, the generating the quality profile including,
      determining a first quality value corresponding to a starting position in the authentication image based on a variance of pixels in a window at the starting position,
      determining at least one second quality value corresponding to at least one other position in the authentication image by moving the window from the start position to an end position in the authentication image, and
      generating the quality profile of the authentication image based on the first quality value and the at least one second quality value;
   determining an effective region in the authentication image based on the quality profile, the determining the effective region including,
      dividing the authentication image into at least one effective segment and at least one ineffective segment by comparing the quality profile of the authentication image to a threshold,
      verifying a quality of the at least one ineffective segment,
      determining a final ineffective segment based on a result of the verifying, and
      omitting the final ineffective segment from the authentication image to determine the effective region in the authentication image; and
   determining whether the authentication image is authenticated based on the effective region in the authentication image to a registered image.

2. The authentication method of claim 1, wherein the generating of the quality profile of the authentication image comprises:
   determining a window, the window including a target region in the authentication image and a neighboring region of the target region, the neighboring region being in the authentication image; and
   determining a quality of the target region based on a variance of pixels in the window.

3. The authentication method of claim 1, further comprising:
   generating a quality profile of the registered image, the quality profile of the registered image indicating a quality of the registered image; and
   determining an effective region in the registered image based on the quality profile of the registered image.

4. The authentication method of claim 3, wherein the determining of whether the authentication image is authenticated comprises:
   comparing the effective region in the authentication image to the effective region in the registered image.

5. The authentication method of claim 1, wherein the generating of the quality profile of the authentication image comprises:
   generating the quality profile of the authentication image based on a column, a row, or a single pixel of the authentication image.

6. The authentication method of claim 1, wherein the at least one ineffective segment is a plurality of ineffective segments and the determining of the effective region in the authentication image comprises:
   determining a first region between two of the plurality of ineffective segments, the determined first region being the effective region in the authentication image.

7. The authentication method of claim 1, wherein the determining of the effective region of the authentication image comprises:
   determining a first region in the authentication image, the first region having a greatest width not including the final ineffective segment, and the determined first region being the effective region in the authentication image.

8. The authentication method of claim 1, wherein the determining of the effective region in the authentication image comprises:
   determining the effective region in the authentication image to include the at least one effective segment.

9. The authentication method of claim 1, wherein the threshold comprises an upper threshold part and a lower threshold part, the upper threshold part indicating an upper limit of the first quality value and the at least one second quality value for the at least one effective segment, and the lower threshold part indicating a lower limit of the first quality value and the at least one second quality value for the at least one effective segment.

10. The authentication method of claim 1, wherein the generating of the quality profile of the authentication image comprises:
    determining a first window, the first window including a target region in the authentication image and a neighboring region of the target region, the neighboring region being in the authentication image;
    determining a second window, the second window having a size different from a size of the first window; and
    obtaining a quality of the target region based on a quality profile associated with the first window and a quality profile associated with the second window.

11. The authentication method of claim 1, further comprising:
    determining whether an authentication error occurs based on the effective region in the authentication image; and
    adjusting a size of a window in response to the occurrence of an authentication error, the size of the window associated with the quality profile.

12. The method of claim 1, wherein the determining whether the authentication image is authenticated includes, performing authentication on the authentication image.

13. An authentication method comprising:
    generating a quality profile of an authentication image, the quality profile of the authentication image indicating a quality of the authentication image;
    determining an effective region in the authentication image based on the quality profile; and determining whether the authentication image is authenticated based on the effective region in the authentication image to a registered image, wherein the determining of the effective region in the authentication image includes,
  determining a quality ranking of a first region and a quality ranking of a second region based on the quality profile, the first region being at one end of the authentication image and the second region being at an opposite end of the one end of the authentication image,
  determining a removal region based on a ratio between the quality ranking of the first region and the quality ranking of the second region, and
  determining a remaining region in the authentication image as the effective region in the authentication image, the remaining region excluding the removal region, wherein the removal region has a preset size.

14. A non-transitory computer-readable medium storing a computer program that includes instructions which, when executed by one or more processors, cause the one or more processors to perform the method of claim 1.

15. An authentication apparatus, comprising:
at least one processor configured to execute computer-readable instructions to,
generate a quality profile of an authentication image, the quality profile of the authentication image indicating a quality of the authentication image by
  determining a first quality value corresponding to a starting position in the authentication image based on a variance of pixels in a window at a starting position,
  determining at least one second quality value corresponding to at least one other position in the authentication image by moving the window from the start position to an end position in the authentication image, and
  generating the quality profile of the authentication image based on the first quality value and the at least one second quality value;
determine an effective region in the authentication image based on the quality profile by
  dividing the authentication image into at least one effective segment and at least one ineffective segment by comparing the quality profile of the authentication image to a threshold,
  verifying a quality of the at least one ineffective segment,
  determining a final ineffective segment based on a result of the verifying, and
  omitting the final ineffective segment from the authentication image to determine the effective region in the authentication image; and
determine whether the authentication image is authenticated based on the effective region in the authentication image to a registered image.

16. The authentication apparatus of claim 15, wherein the at least one processor is configured to execute computer-readable instructions to determine a window, the window including a target region in the authentication image and a neighboring region of the target region, the neighboring region being in the authentication image, and the at least one processor is further configured to obtain a quality of the target region based on a variance of pixels in the window.

17. The authentication apparatus of claim 15, wherein the at least one processor is configured to execute computer-readable instructions to,
generate a quality profile of the registered image, the quality profile of the registered image indicating a quality of the registered image, and
determine an effective region in the registered image based on the quality profile of the registered image.

18. The authentication apparatus of claim 17, wherein the at least one processor is configured to execute computer-readable instructions to determine whether the authentication image is authenticated by comparing the effective region in the authentication image to the effective region in the registered image.

19. The authentication apparatus of claim 15, wherein the at least one processor is configured to execute computer-readable instructions to generate the quality profile of the authentication image based on a column, a row, or a single pixel of the authentication image.

20. The authentication apparatus of claim 15, wherein the at least one ineffective segment is a plurality of ineffective segments and the at least one processor is configured to execute computer-readable instructions to determine a first region between two of the plurality of ineffective segments, the determined first region being the effective region in the authentication image.

21. The authentication apparatus of claim 15, wherein the at least one processor is configured to execute computer-readable instructions to determine the effective region in the authentication image to include the at least one effective segment.

22. The authentication apparatus of claim 15, wherein the threshold comprises an upper threshold part and a lower threshold part, the upper threshold part indicating an upper limit of the first quality value and the at least one second quality value for the at least one effective segment, and the lower threshold part indicating a lower limit of the first quality value and the at least one second quality value for the at least one effective segment.

23. The authentication apparatus of claim 15, wherein the at least one processor is configured to execute computer-readable instructions to determine a first window and a second window, the first window including a target region in the authentication image and a neighboring region of the target region, the neighboring region being in the authentication image, and the second window has a size different from a size of the first window, and the at least one processor is configured to execute computer-readable instructions to obtain a quality of the target region based on a variance of pixels in the first window and a variance of pixels in the second window.

24. An authentication apparatus comprising:
at least one processor configured to execute computer-readable instructions to,
  generate a quality profile of an authentication image, the quality profile of the authentication image indicating a quality of the authentication image;
  determine an effective region in the authentication image based on the quality profile; and
  determine whether the authentication image is authenticated based on the effective region in the authentication image to a registered image, wherein the at least one processor is configured to execute computer-readable instructions to determine a quality ranking of a first region and a quality ranking of a second region based on the quality profile, the first region being at one end of the authentication image and the second region being at an opposite end of the one end of the authentication image, determine a removal region based on a ratio between the quality ranking of the first region and the quality ranking of the second region, and determine a remaining region in the authentication image as the effective region in the authentication image, the remaining region excluding the removal region, wherein the removal region has a preset size.

25. An authentication method, comprising:
determining a window, the window including a target region in an authentication image and a neighboring region of the target region, the neighboring region being in the authentication image;
obtaining a quality profile of the authentication image, the obtaining the quality profile including,
   determining a first quality value corresponding to a first target region based on a variance of pixels in a window at a starting position in the authentication image,
   determining at least one second quality value corresponding to at least one other target region by moving the window from the start position to an end position in the authentication image, and
   generating the quality profile of the authentication image based on the first quality value and the at least one second quality value;
determining an effective region in the authentication image based on the quality profile, the determining the effective region including,
   omitting at least one ineffective segment of the authentication image to determine the effective region;
determining whether to adjust a size of the window based on the effective region; and
determining whether the authentication image is authenticated based on the effective region in the authentication image to a registered image.

26. The authentication method of claim 25, wherein the determining of the effective region in the authentication image comprises:
dividing the authentication image into an effective segment and an ineffective segment by comparing a quality profile to a threshold, the quality profile indicating a quality of the authentication image.

27. The authentication method of claim 25, wherein the determining of the effective region in the authentication image comprises:
determining a first region between a first ineffective segment and second ineffective segment, the first ineffective segment being at one end of the authentication image and the second ineffective segment being at an opposite end of the authentication image, the determined first region being the effective region in the authentication image.

28. The method of claim 25, further comprising:
performing authentication on the authentication image based on the effective region.

29. An authentication apparatus, comprising:
at least one processor configured to execute computer-readable instructions to,
determine a window, the window including a target region in an authentication image and a neighboring region of the target region, the neighboring region being in the authentication image;
obtain a quality profile of the target region based on a variance of pixels in the window by
   determining a first quality value corresponding to a first target region based on a variance of pixels in a window at a starting position in the authentication image,
   determining at least one second quality value corresponding to at least one other target region by moving the window from the start position to an end position in the authentication image, and
   generating the quality profile of the authentication image based on the first quality value and the at least one second quality value;
determine an effective region in the authentication image based on the quality profile by omitting at least one ineffective segment of the authentication image to determine the effective region;
determine whether to adjust a size of the window based on the effective region; and
determining whether the authentication image is authenticated based on the effective region in the authentication image to a registered image.

30. A registration method, comprising:
receiving a registered image;
generating a quality profile of the registered image, the quality profile indicating a quality of the registered image, the generating the quality profile including,
   determining a first quality value corresponding to a starting position in the registered image based on a variance of pixels in a window at the starting position,
   determining at least one second quality value corresponding to at least one other position in the registered image by moving the window from the start position to an end position in the registered image, and
   generating the quality profile of the registered image based on the first quality value and the at least on second quality value;
determining an effective region in the registered image based on the quality profile of the registered image, the determining the effective region including,
   dividing the registered image into at least one effective segment and at least one ineffective segment by comparing the quality profile of the registered image to a threshold,
   verifying a quality of the at least one ineffective segment,
   determining a final ineffective segment based on a result of the verifying, and
   omitting the final ineffective segment from the registered image to determine the effective region in the registered image; and
generating a registration database based on the effective region in the registered image.

31. The registration method of claim 30, wherein the generating of the quality profile of the registered image comprises:
determining a window, the window including a target region in the registered image and a neighboring region of the target region, the neighboring region being in the registered image; and
obtaining a quality of the target region based on a variance of pixels in the window.

32. The registration method of claim 30, wherein the generating of the quality profile of the registered image comprises:
generating the quality profile based on a column, a row, or a single pixel of the registered image.

* * * * *